Nov. 29, 1927.

J. BOYKOW

AERIAL SURVEYING BY PHOTOGRAPHY

Filed June 28, 1921

1,650,978

Inventor:
Johann Boykow
by B. Singer Atty

Patented Nov. 29, 1927.

1,650,978

UNITED STATES PATENT OFFICE.

JOHANN BOYKOW, OF SCHONEBERG, NEAR BERLIN, GERMANY, ASSIGNOR TO THE FIRM OF IPPCO-GESELLSCHAFT MIT BESCHRANKTER HAFTUNG INTERNATIONALE PROJEKTION-PROPAGANDA-COMPAGNIE, OF FRIEDMAN, NEAR BERLIN, GERMANY.

AERIAL SURVEYING BY PHOTOGRAPHY.

Application filed June 28, 1921, Serial No. 481,087, and in Germany August 29, 1919.

(GRANTED UNDER THE PROVISIONS OF THE ACT OF MARCH 3, 1921, 41 STAT. L., 1313.)

Figure 1:
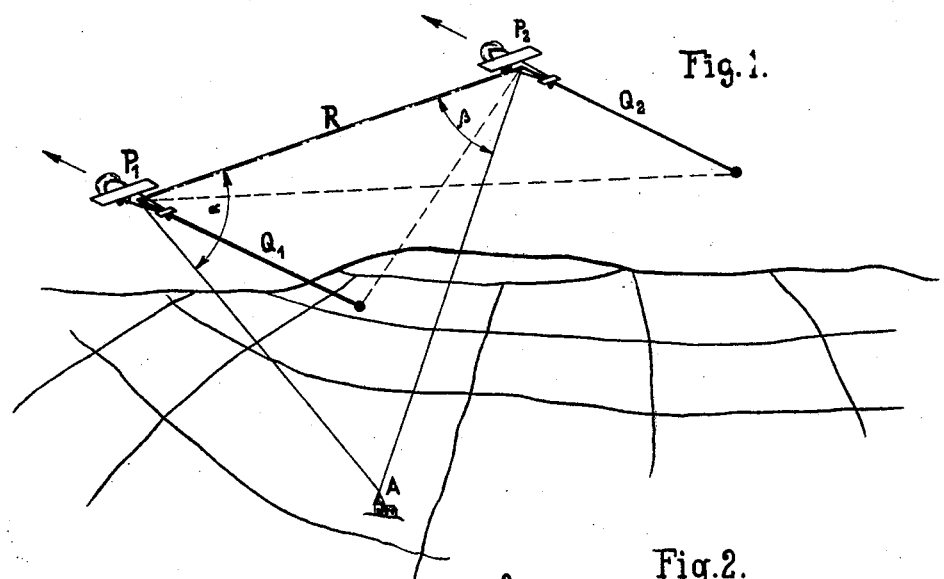
Figure 2:
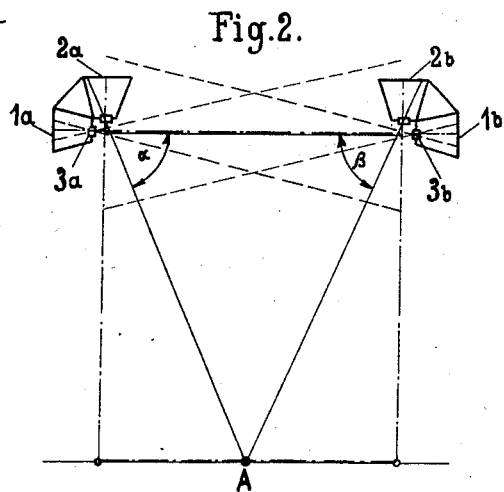
Figure 3:
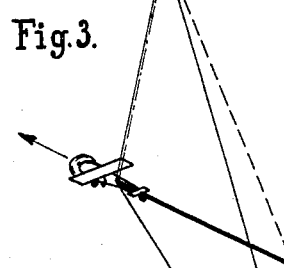

This invention relates to a method of aerial surveying by photography and has for its object to combine the usual geodetic measuring process with the aerial photographic process in a single aerial-geodetic process. According to the present invention the provision of a geodetic "net" is rendered unnecessary owing to the fact that photographs of the landscape are taken from at least two aircraft and at least one of the concerned aircraft photographs another concerned aircraft all the exposures being substantially simultaneous or being made with small known time interval. The manner in which the new process may be performed will be explained in detail with reference to the annexed drawing wherein Fig. 1 is a diagrammatic perspective showing a pair of aircraft suitably provided with photographic means in proper relation to each other for taking the photographs required for the new aero-photographic process. Fig. 2 is a diagrammatic axial section through the cameras mounted on the two aircraft shown in Fig. 1 and shows a geometric construction forming the base for trigonometric calculation in carrying through the surveying process. Figure 3 is a perspective showing of a modified aircraft relation for taking the photographs for the surveying of the landscape. In Fig. 1 two aircraft are designated $P_1$, $P_2$. The aircraft are shown flying above the ground which it is intended to survey. The aircraft are provided with ropes $Q_1$, $Q_2$ respectively. R indicates an imaginary straight line connecting the two aircraft with each other, this line forming the air base of the survey. A is a point on the ground to be surveyed. Each aircraft carries a pair of cameras not shown in Fig. 1 but illustrated apart out of connection with the aircraft in Fig. 2. The pair of cameras are designated $1^a$, $1^b$, $2^a$, $2^b$ respectively.

The cameras of each pair are in fixed and known relation to each other. Cameras $1^a$ and $1^b$ are directed towards each other so as to allow mutual photographing of the two carrying aircraft. Cameras $2^a$ and $2^b$ are directed towards the ground so as to allow photographing of the landscape.

The photographs obtained by cameras $1^a$ and $1^b$ may be used for determining the distance of the aircraft from each other which forms the air base R of the surveying operation. In the drawing two pairs of dotted lines are shown the lines of the pairs crossing each other in the object glasses $3^a$, $3^b$ of the cameras $1^a$ and $1^b$ respectively. These dotted lines are assumed to represent straight lines directed towards the front ends of the opposite aircraft and the rear ends of the ropes $Q_1$, $Q_2$ carried thereby respectively; the aircraft being assumed to be positioned substantially parallel to each other. The length of the image of an aircraft appearing on the photographic plate in each of the cameras $1^a$, $1^b$ is equal to the distance of the points of intersection between the plate and the two dotted lines crossing each other in the concerned lens $3^a$ or $3^b$. It is easily understood that there exists a simple geometrical relation between the distance of the aircraft from each other and the focal length of the object glass of each camera, the length of the aircraft in question and the length of its image on the photographic plate, so that the air base can be found by calculation if the focal length of a camera object glass, the length of the photographed aircraft and that of its image on the photographic plate are known. The purpose of the cables $Q_1$, $Q_2$ carried by the aircraft is to prevent, the images of the aircraft on the photographic plates in the cameras becoming too small for allowing exact calculation of the air base. The cables $Q_1$, $Q_2$ may be provided with suitable marks at predetermined distances. One perceives that it is sufficient to photograph only one aircraft with a photographic camera mounted on the other aircraft, however for securing higher exactness of measurement it is advisable that both the aircraft at the ends of the air base photograph each other.

The pictures of the landscape produced on the photographic plates of the cameras $2^a$ and $2^b$ can be used for determining the position of each point appearing thereon with relation to the air base.

One of the points on the ground on which the position is to be determined is designated on the drawing with the letter A. In order to determine the position of this point A with relation to the air base R, that is to say to the line connecting the two aircraft, it is necessary to know three elements of the triangle formed by the air base and the two lines of vision from the two aircraft $P_1$, $P_2$ to the point A. The air base being known, it is only necessary to determine two further elements of said triangle. Such two further elements, namely the angles $\alpha$, $\beta$ can be determined in the following way:—

The position of the two cameras on each of the aircraft with relation to each other being known, it follows that also the position of the optical axes with relation to each other is known. Since the point of intersection of the base, that is the ray running from one aircraft to the other with the image plate in the cameras $1^b$, $1^a$ is known, it is possible to trigonometrically determine the angle between the base and the axes of the cameras. From this it follows that it is also possible to trigonometrically determine the angles $\alpha$ and $\beta$ between the base and the two directions of vision from the cameras $2^a$ and $2^b$ to the point A. Such determination can be made for the angles adjacent the air base for each of the triangles between the air base and the directions of vision towards any chosen point on the ground. This shows that triangulation for a piece of the ground appearing on the photographs taken by the cameras $2^a$ and $2^b$ can be carried through with relation to the air base between the two aircraft in the same way as with relation to a base on the ground in the normal terrestrial surveying.

It can be seen without difficulty that, the position of the two cameras on the two air craft with relation to each other being known and also the range between these two cameras being known, it is possible to create a stereoscopic picture of the ground by arranging the two photographic plates with relation to each other in the same position as they had in the moment of exposure. Such stereoscopic picture can be used in accordance with old methods to reproduce a true stereoscopic copy of the ground in a known scale without any measurement on the ground.

It appears that there is no difficulty in placing over an extended landscape, in a purely aerial geodetic way, a polygon that can be determined with any desired accuracy and in which as many control bases as desired could be measured in the manner described. The invention also extends to maps and cards produced by the process described.

What I claim is:

1. The method of surveying by means of aerial photography which consists in mounting a camera on each of two aircrafts respectively, flying said crafts over the terrain and taking a photograph with each camera of a common area of landscape to be surveyed, and at least with one of the cameras a photograph of the craft carrying the other camera, said photographs being taken substantially simultaneously.

2. The method of surveying by means of aerial photography which consists in mounting a camera on each of two aircrafts respectively, flying said crafts over the terrain and taking a photograph with each camera of a common area of landscape to be surveyed, and at least with one of the cameras a photograph of the craft carrying the other camera, the last named craft being provided with a trailing rope of known length.

In testimony whereof I have signed this specification.

JOHANN BOYKOW.